(12) United States Patent
Wang et al.

(10) Patent No.: US 8,837,870 B1
(45) Date of Patent: Sep. 16, 2014

(54) FIBER COUPLED LASER DEVICE HAVING HIGH POLARIZATION EXTINCTION RATIO AND HIGH STABILITY

(71) Applicant: Photop Technologies, Inc., Fuzhou (CN)

(72) Inventors: Zhenyu Wang, Shanghai (CN);
Shaofeng Zhang, Shanghai (CN);
Dashan Li, Shanghai (CN)

(73) Assignee: Photop Technologies, Inc., Fuzhou (CN)

( * ) Notice: Subject to any disclaimer, the term of this patent is extended or adjusted under 35 U.S.C. 154(b) by 0 days.

(21) Appl. No.: 13/872,895

(22) Filed: Apr. 29, 2013

(51) Int. Cl.
| | | |
|---|---|---|
| *G02B 6/26* | (2006.01) | |
| *G02B 6/42* | (2006.01) | |
| *G02B 6/27* | (2006.01) | |
| *G02B 27/28* | (2006.01) | |
| *G02B 5/32* | (2006.01) | |
| *G02B 5/30* | (2006.01) | |

(52) U.S. Cl.
CPC ............ *G02B 6/2773* (2013.01); *G02B 6/2706* (2013.01); *G02B 27/283* (2013.01); *G02B 27/286* (2013.01); *G02B 5/32* (2013.01); *G02B 5/3083* (2013.01)
USPC ............ 385/11; 385/27; 385/49; 359/489.01; 359/489.06; 359/489.08; 359/489.11

(58) Field of Classification Search
CPC ...... G02B 6/272; G02B 6/2706; G02B 6/276; G02B 6/2773; G02B 6/024; G02B 6/126; G02B 27/283; G02B 27/26; G02B 27/286; G02B 5/3083; G02B 5/32
USPC ............................ 385/11; 359/489.08, 489.11
See application file for complete search history.

(56) References Cited

U.S. PATENT DOCUMENTS

| | | | | |
|---|---|---|---|---|
| 5,033,830 | A | * | 7/1991 | Jameson .................. 359/484.03 |
| 2001/0048782 | A1 | * | 12/2001 | Teng et al. ...................... 385/11 |
| 2002/0044732 | A1 | * | 4/2002 | Yoon et al. ...................... 385/24 |
| 2002/0089745 | A1 | * | 7/2002 | Huang et al. .................. 359/484 |
| 2005/0180010 | A1 | * | 8/2005 | Mukaiyama et al. ......... 359/497 |
| 2008/0013165 | A1 | * | 1/2008 | Webb ............................. 359/352 |

* cited by examiner

*Primary Examiner* — Ryan Lepisto
(74) *Attorney, Agent, or Firm* — SV Patent Service

(57) ABSTRACT

A fiber laser device includes a laser source that can emit a source laser beam, a birefringent beam separator configured to receive the source laser beam and to split the source laser beam into an o ray and an e ray which have mutually orthogonal polarizations, and a polarization maintaining fiber comprising a fiber core characterized by a core diameter, wherein after the o ray and the e ray exit birefringent beam separator, the o ray and the e ray are separated by a distance that is larger than the fiber core of the polarization maintaining fiber. The polarization maintaining fiber is positioned to couple one of the o ray and the e ray into the fiber core. The one of the o ray and the e ray transmits through the polarization maintaining fiber to form an output laser beam.

20 Claims, 4 Drawing Sheets

FIBER COUPLED LASER DEVICE HAVING HIGH POLARIZATION EXTINCTION RATIO AND HIGH STABILITY

BACKGROUND OF THE INVENTION

The present application relates to laser devices, specifically to fiber coupled laser devices having high polarization extinction ratio and low noise.

Polarization maintaining (PM) fiber coupled lasers, for their strong polarization maintaining capacities, play a more and more important role in optical communication, optical sensing, industry, aerospace industry, and biomedicine.

A PM fiber achieves high birefringence difference between two polarization modes by stress or deformation. A PM fiber can suppress phase and polarization fluctuations in laser light which may be caused by stress, deformation, temperature or composition and shape defects in the fiber. However, the polarization state of the laser light in the fiber will be changed if the external interferences are strong. Another challenge in implementation of a PM fiber laser is that it can be very difficult to align the stress axis of a PM fiber to be parallel to the polarization direction of the input laser. If the fiber stress axis and the polarization direction of the input laser are not strictly parallel, the two polarization modes in the fiber interfere with each other when external disturbances increase, which can cause polarization extinction ratio to decline and optical noise to increase, and can seriously affect laser output stability.

There is therefore a need for a fiber laser device that has high extinction coefficient and insensitive to external interferences.

SUMMARY OF THE INVENTION

The present application discloses very compact fiber coupled laser devices that have high polarization extinction ratios and not sensitive to external interferences. The disclosed fiber coupled laser devices can output laser beams with high stability and low noise.

In one general aspect, the present invention relates to a fiber laser device that includes a laser source configured to emit a source laser beam; a birefringent beam separator configured to receive the source laser beam and to split the source laser beam into an o ray and an e ray which are parallel to each other and have mutually orthogonal polarizations; and a polarization maintaining fiber comprising a fiber core characterized by a core diameter, wherein after the o ray and the e ray exit birefringent beam separator, the o ray and the e ray are separated by a distance that is three times or larger than the fiber core of the polarization maintaining fiber, wherein the polarization maintaining fiber is positioned to couple one of the o ray and the e ray into the fiber core, wherein the one of the o ray and the e ray transmits through the polarization maintaining fiber to form an output laser beam.

Implementations of the system may include one or more of the following. The distance between the o ray and the e ray can be three times or larger than the fiber core of the polarization maintaining fiber. The distance between the o ray and the e ray can be five times or larger than the fiber core of the polarization maintaining fiber. The o ray and the e ray can transmit through the birefringent beam separator. The o ray and the e ray can be substantially parallel to each other after the o ray and the e ray exit the birefringent beam separator. The polarization maintaining fiber can have its optical axis parallel or perpendicular to the polarization of the one of o ray and the e ray transmitting in the fiber core of the polarization maintaining fiber. The polarization maintaining fiber can couple the o ray into the fiber core while keeping the e ray outside the fiber core. The polarization maintaining fiber can couple the e ray into the fiber core while keeping the o ray outside the fiber core. The birefringent beam separator can be formed by a crystalline material. The birefringent beam separator can include YVO4, α-BBO, or caicifen. The birefringent beam separator can be formed by a non-crystalline material. The birefringent beam separator can have a birefringence difference in a range between 0.05 and 0.3. The thickness of the birefringent beam separator can be in a range between 0.1 mm and 5 mm. The diameter of the fiber core of the polarization maintaining fiber can be in a range between 1 μm and 10 μm. The laser source can include a laser diode, or a solid state laser. The polarization maintaining fiber can have an end face that is polished 0° or 8° angle relative to a longitudinal direction of the fiber core. The fiber laser device can further include a fiber ferrule in which one end of the polarization maintaining fiber is mounted. The fiber laser device can further include a coupling optical system configured to direct the source laser beam to the birefringent beam separator. The coupling optical system can focus the one of the o ray and the e ray into the fiber core in the polarization maintaining fiber. At least one surface on the birefringent beam separator or an end face of the polarization maintaining fiber can be coated by an antireflection layer.

These and other aspects, their implementations and other features are described in detail in the drawings, the description and the claims.

DETAILED DESCRIPTION OF THE INVENTION

Figure 1:
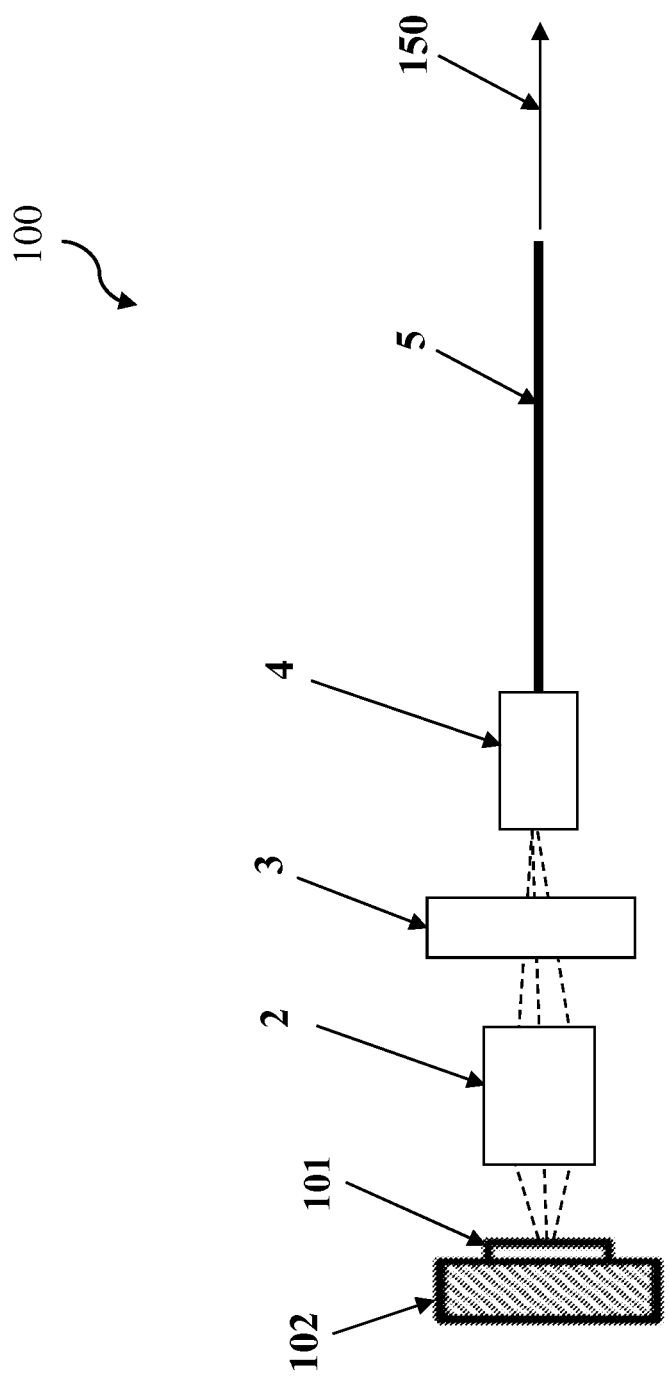
FIG. 1 is a schematic view of a fiber coupled laser having high polarization extinction ratio in accordance with the present invention.
Figure 2:
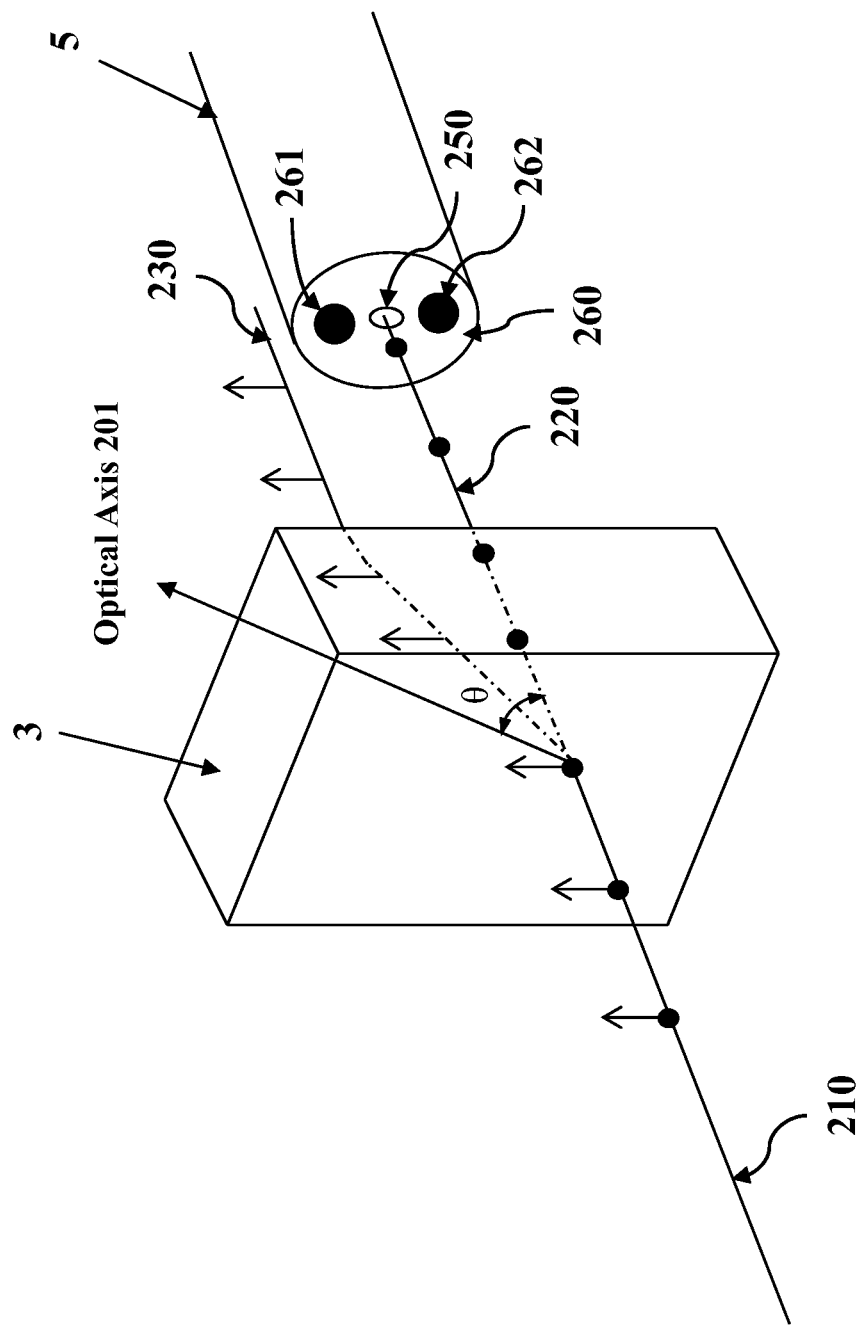
FIG. 2 is a perspective view of a birefringent walk-off crystal to illustrate the functions of the birefringent beam separator.

In some embodiments, referring to FIGS. 1 and 2, a fiber laser device 100 includes a laser diode 101 mounted on a submount 102, a coupling optical system 2, a birefringent beam separator 3, a fiber ferrule 4, and a polarization maintaining fiber 5 having one end mounted in the fiber ferrule 4. The submount 102 can be made of heat conductive material such as AlN. The coupling optical system 2 can be implemented by a single lens. The birefringent beam separator 3 is placed between the coupling optical system 2 and the fiber ferrule 4. The fiber ferrule 4 can be made of ceramic or glass material. The PM fiber 5 has a fiber core 250 for transmitting laser light.

The laser diode 101 emits a source laser beam 210, which is focused into the birefringent beam separator 3 by the coupling optical system 2. The birefringent beam separator 3 divides source laser beam 210 into two beams: an o ray 220 (i.e. ordinary beam) and an e ray 230 (i.e. extraordinary beam), which transmit through the birefringent beam separator 3. Each of the o ray 220 and the e ray 230 has a single polarization direction; their respective polarizations are perpendicular to each other. After the o ray 220 and the e ray 230 exit the birefringent beam separator 3, the o ray 220 and the e ray 230 are parallel to each other. The birefringent beam separator 3 is so configured to render the distance between the o ray 220 and the e ray 230 to be larger than the diameter of the fiber core 250 of the PM fiber 5. For example, the distance between the o ray 220 and the e ray 230 is at least 3 times as large as the core diameter of the PM fiber 5. In another example, the distance between the o ray 220 and the e ray 230 is 5 times or larger than as the core diameter of the PM fiber 5. The PM fiber 5 couples one of the o ray 220 and the e ray 230 and transmit it there through to form an output laser beam 150.

To effectively displace the e ray from the o ray, the birefringent beam separator 3 can have a birefringence difference between the e ray and the o ray higher than 0.1. The birefringent beam separator can be implemented by a birefringent crystal or birefringent non-crystalline material such as plastics or epoxy that is pressured or stretched to make birefringent. Other exemplified materials suitable for the birefringent beam separator include α-BBO, or caicifen.

In one implementation, the birefringent beam separator 3 can be a $YVO_4$ crystal. The laser wavelength of the source laser beam 210 is at 635 nm. The PM fiber 5 has a core diameter about 4 μm~5 μm. The birefringent beam separator 3 has an optical axis 201 that is aligned at 45° off the polarization direction of the source laser beam 210. For a $YVO_4$ crystal about 0.5 mm~1 mm in thickness along the laser propagation direction (the directions of the source laser beam 210 or the o ray 220), the distance between the o ray and the e ray is about 52.9 μm~105.8 μm as the two rays exit the $YVO_4$ crystal. The distance is far greater than the core diameter of the PM fiber 5.

The PM fiber 5 is so positioned to allow only one of the o ray 220 and the e ray 230 to be coupled into the fiber core 250 of the PM fiber 5. For example, as shown in FIG. 2, the o ray is coupled into the fiber core of the PM fiber 5 while the e ray is kept out of the PM fiber 5. Alternatively, the e ray can be couple into the fiber core 250 of the PM fiber 5 while the o ray is kept out of the PM fiber 5.

In some embodiments, the polarization maintaining fiber can have an end face 260 that is polished at 0° or 8° angle relative to the lateral direction of the fiber core 250 (in FIG. 2, the o ray is parallel to the longitudinal direction of the fiber core 250). The 8° angle can used to reduce multiple reflections. The PM fiber 5 is characterized by cat's eyes 261, 262 of the Panda type PM fiber. The line connecting the cat's eyes 261, 262 define the stress axis of the PM fiber 5. The faces of the birefringent beam separator 3 and/or the end face of the polarization maintaining fiber 5 can be coated by an antireflection layer. The polarization optical axis of the PM fiber 5 is aligned parallel or perpendicular to the polarization direction of the o ray or the e ray traveling in the PM fiber 5, which maintains the polarization of the laser as it travels in the PM fiber 5. Since only one of the e ray or the o ray is coupled into the PM fiber 5, the laser light travelling in the PM fiber 5 has a single polarization. Thus polarization interferes between the o rays and the e rays in conventional fiber laser systems are eliminated in the fiber laser device 100. The polarization extinction ratio of fiber coupled laser can be improved; noise can be reduced in the fiber laser device 100.

It should be noted that the optical components can have dimensions other than the examples given above. For example, the birefringent beam separator can have a birefringence value in a range between 0.05 and 0.3. The thickness of the birefringent beam separator can be in a range between 0.1 mm and 5 mm. The diameter of the fiber core of the polarization maintaining fiber can be in a range between 1 μm and 10 μm.

Figure 3:
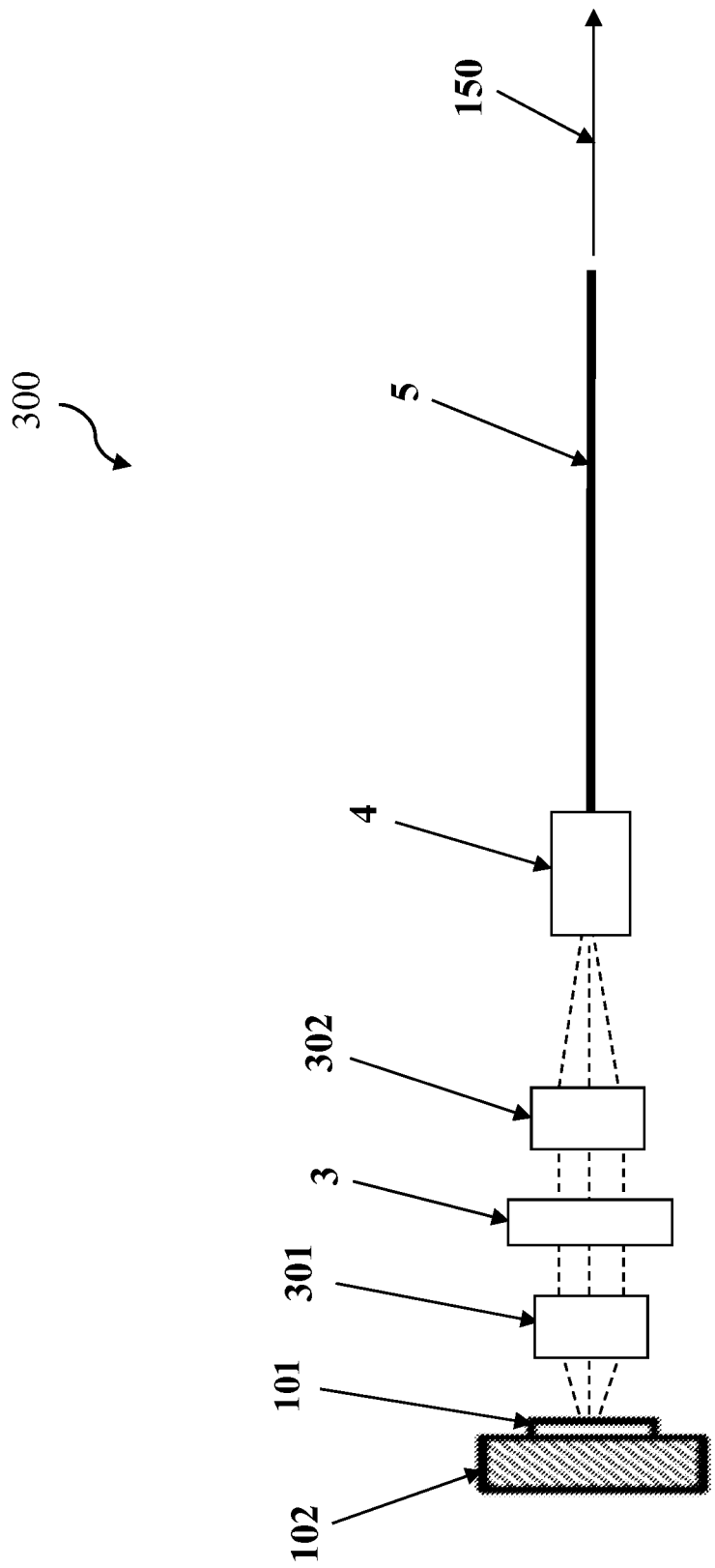
FIG. 3 is a schematic view of another fiber coupled laser having high polarization extinction ratio in accordance with the present invention.

In some embodiments, referring to FIG. 3, a fiber laser device 200 includes a laser diode 101 which can be implemented by a semiconductor laser diode configured to emitting laser at 405 nm. The laser diode can also emit laser beam at 488 nm, 785 nm, 830 nm, and so on. A coupling optical system includes a pair of aspheric lenses 301, 302 positioned along the laser propagation direction on two sides of the birefringent beam separator 3. The pair of aspheric lenses 301, 302 can increase coupling efficiency compared to a single lens. The laser beam emitted by the laser diode 101 is collimated into parallel light by the collimating aspheric lens 301. The parallel light passes through the birefringent beam separator 3, which is split into o ray and e ray with mutually orthogonal polarizations as described above. The o ray and e ray are focused by the focusing aspherical lens 302 at the plane at the input end of the PM fiber 5. The PM fiber 5 has a core diameter about 4 μm~5 μm. The birefringent beam separator 3 is α-BBO, 0.5 mm in thickness in the laser propagation direction. The distance between the o ray and the e ray after their exits from the birefringent beam separator 3 is about 44.1 μm, which is far greater than the core diameter of the PM fiber 5. The PM fiber 5 is positioned to couple only one of the o ray or the e ray into the fiber core of the PM fiber 5. The optical axis of the PM fiber 5 is aligned parallel or perpendicular to the polarization direction of the o ray or the e ray traveling in the PM fiber 5.

Figure 4:
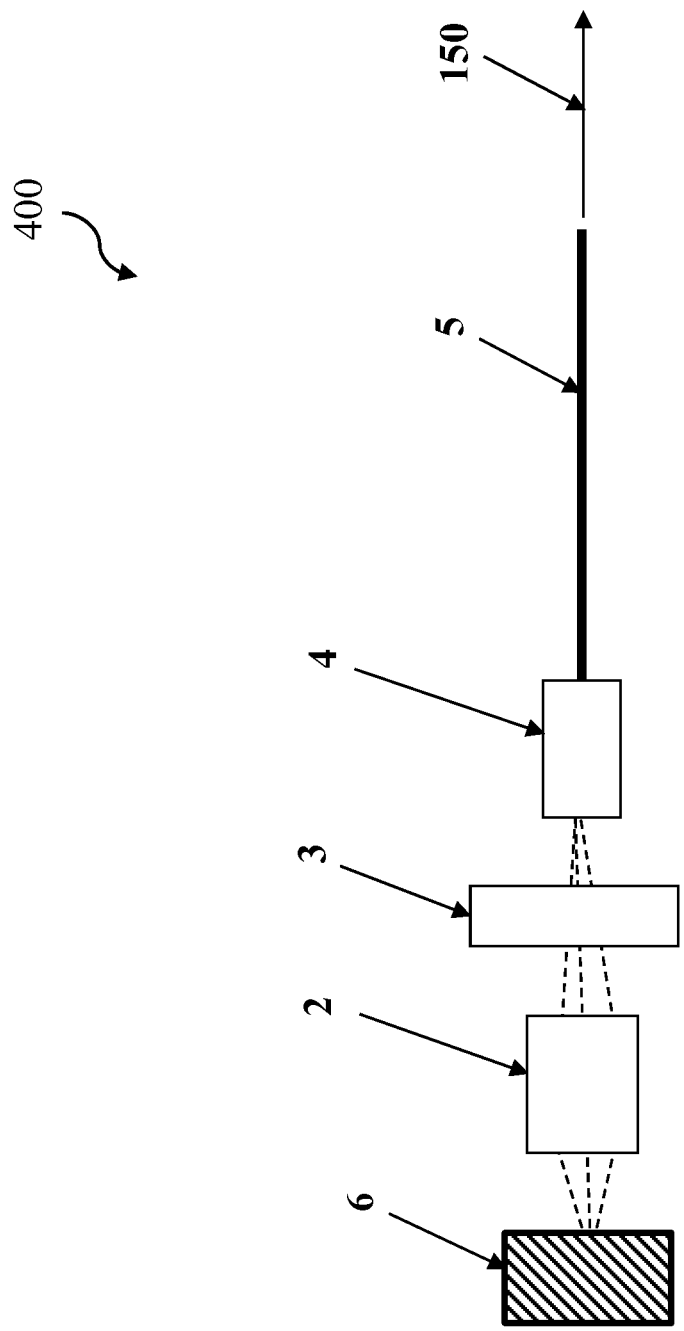
FIG. 4 is a schematic view of still another fiber coupled laser having high polarization extinction ratio in accordance with the present invention.

In some embodiments, referring to FIG. 4, a fiber laser device 300 includes a solid state laser 6 that can be pumped by a diode and emits laser light at 532 nm. The coupling optical system 2 can be implemented by a single lens. The solid state laser 6 emits a source laser beam, which is focused into a birefringent beam separator 3 by a focusing lens. The birefringent beam separator 3 can be implemented by α-BBO, 0.5 mm in thickness. As described above, the birefringent beam separator 3 splits the source laser beam into an o ray and an e ray which are spaced apart by about 44.1 μm after they exit the birefringent beam separator 3. The PM fiber 5 has a core diameter about 4~5 μm. The PM fiber 5 is positioned to receive one of the o ray or e ray into the fiber core of the PM fiber 5.

Only a few examples and implementations are described. Other implementations, variations, modifications and enhancements to the described examples and implementations may be made without deviating from the spirit of the present invention. For example, the birefringent beam separator can be implemented by other materials aside from the examples provided above. The focusing system can be implemented by one or a combination of optical components that direct laser beam from a laser source to the birefringent beam separator and then to the polarization maintaining fiber. Moreover, laser sources other than the types and emission wavelengths described above can be used in the disclosed invention.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A fiber laser device, comprising:
   a laser source configured to emit a source laser beam, wherein the source laser beam is divergent;
   a coupling optical system configured to focus the source laser beam to form a convergent laser beam;
   a birefringent beam separator configured to receive the convergent laser beam and to split the convergent laser beam into an o ray and an e ray which have mutually orthogonal polarizations; and
   a polarization maintaining fiber comprising a fiber core characterized by a core diameter, wherein after the o ray and the e ray exit birefringent beam separator, the o ray and the e ray are separated by a distance that is larger than the fiber core of the polarization maintaining fiber, wherein the polarization maintaining fiber is positioned to couple one of the o ray and the e ray into the fiber core, wherein the one of the o ray and the e ray transmits through the polarization maintaining fiber to form an output laser beam.

2. The fiber laser device of claim 1, wherein the polarization maintaining fiber has an end face that is polished at a finite angle relative to a lateral direction of the fiber core.

3. The fiber laser device of claim 1, wherein the distance between the o ray and the e ray is five times or larger than the fiber core of the polarization maintaining fiber.

4. The fiber laser device of claim 1, wherein the o ray and the e ray transmit through the birefringent beam separator.

5. The fiber laser device of claim 4, wherein the o ray and the e ray are substantially parallel to each other after the o ray and the e ray exit the birefringent beam separator.

6. The fiber laser device of claim 1, wherein the polarization maintaining fiber has its optical axis parallel or perpendicular to the polarization of the one of o ray and the e ray transmitting in the fiber core of the polarization maintaining fiber.

7. The fiber laser device of claim 1, wherein the polarization maintaining fiber is configured to couple the o ray into the fiber core while keeping the e ray outside the fiber core.

8. The fiber laser device of claim 1, wherein the polarization maintaining fiber is configured to couple the e ray into the fiber core while keeping the o ray outside the fiber core.

9. The fiber laser device of claim 1, wherein the birefringent beam separator is formed by a crystalline material.

10. The fiber laser device of claim 1, wherein the birefringent beam separator comprises $YVO_4$, $\alpha$-BBO, or caicifen.

11. The fiber laser device of claim 1, wherein the birefringent beam separator is formed by a non-crystalline material.

12. The fiber laser device of claim 1, wherein the birefringent beam separator has a birefringence value in a range between 0.05 and 0.3.

13. The fiber laser device of claim 1, wherein the thickness of the birefringent beam separator is in a range between 0.1 mm and 5 mm.

14. The fiber laser device of claim 1, wherein the diameter of the fiber core of the polarization maintaining fiber is in a range between 1 μm and 10 μm.

15. The fiber laser device of claim 1, wherein the laser source comprises a laser diode, or a solid state laser.

16. The fiber laser device of claim 1, wherein the polarization maintaining fiber has a polarization optical axis that is aligned parallel or perpendicular to a polarization direction of the one of the o ray and the e ray that is coupled into the fiber core.

17. The fiber laser device of claim 1, further comprising:
   a fiber ferrule in which one end of the polarization maintaining fiber is mounted.

18. The fiber laser device of claim 1, wherein the coupling optical system is configured to direct the convergent laser beam through the birefringent beam separator.

19. The fiber laser device of claim 18, wherein the coupling optical system is configured to direct the one of the o ray and the e ray into the fiber core in the polarization maintaining fiber.

20. The fiber laser device of claim 1, wherein at least one surface on the birefringent beam separator or an end face of the polarization maintaining fiber is coated by an antireflection layer.

* * * * *